United States Patent
Taylor et al.

(10) Patent No.: US 12,444,548 B2
(45) Date of Patent: Oct. 14, 2025

(54) FLEXIBLE SUPERCAPACITOR WITH GRAPHENE ELECTRODES EMBEDDED IN HYDROGEL ELECTROLYTE

(71) Applicant: INTEGRATED GRAPHENE HOLDING LIMITED, Stirling (GB)

(72) Inventors: Susan Taylor, Stirling (GB); Gabriel Casano, Stirling (GB); Marco Caffio, Stirling (GB)

(73) Assignee: INTEGRATED GRAPHENE HOLDING LIMITED, Stirling (GB)

( * ) Notice: Subject to any disclaimer, the term of this patent is extended or adjusted under 35 U.S.C. 154(b) by 138 days.

(21) Appl. No.: 18/249,271

(22) PCT Filed: Oct. 18, 2021

(86) PCT No.: PCT/GB2021/052690
§ 371 (c)(1),
(2) Date: Apr. 17, 2023

(87) PCT Pub. No.: WO2022/079454
PCT Pub. Date: Apr. 21, 2022

(65) Prior Publication Data
US 2023/0402235 A1    Dec. 14, 2023

(30) Foreign Application Priority Data
Oct. 16, 2020    (GB) .................................. 2016447

(51) Int. Cl.
| | |
|---|---|
| *H01G 11/56* | (2013.01) |
| *H01G 11/36* | (2013.01) |
| *H01G 11/62* | (2013.01) |
| *H01G 11/86* | (2013.01) |

(52) U.S. Cl.
CPC ............. *H01G 11/36* (2013.01); *H01G 11/56* (2013.01); *H01G 11/62* (2013.01); *H01G 11/86* (2013.01)

(58) Field of Classification Search
None
See application file for complete search history.

(56) References Cited

U.S. PATENT DOCUMENTS

| | | | | |
|---|---|---|---|---|
| 10,622,163 | B2* | 4/2020 | Kaner | H01G 11/70 |
| 10,734,167 | B2* | 8/2020 | El-Kady | H01G 11/02 |
| 11,120,952 | B2* | 9/2021 | Zhamu | H01G 11/46 |
| 11,854,739 | B2* | 12/2023 | Bozkurt | C08J 3/075 |
| 2018/0355194 | A1* | 12/2018 | Yadavalli | H01G 11/36 |
| 2019/0237269 | A1* | 8/2019 | Fan | H01G 11/86 |
| 2023/0402235 | A1* | 12/2023 | Taylor | H01G 11/62 |

FOREIGN PATENT DOCUMENTS

| | | | | |
|---|---|---|---|---|
| CN | 111017910 A | * | 4/2020 | |
| CN | 112086290 A | * | 12/2020 | H01G 11/12 |
| WO | WO-2015069332 A1 | * | 5/2015 | C01B 32/192 |

OTHER PUBLICATIONS

International Search Report, dated Mar. 25, 2022, issued in priority International Application No. PCT/GB2021/052690.

* cited by examiner

*Primary Examiner* — Dion R. Ferguson
(74) *Attorney, Agent, or Firm* — Saul Ewing LLP

(57) ABSTRACT

A symmetric supercapacitor device comprising two electrodes, wherein each electrode comprises graphene, and a hydrogel electrolyte enveloping the electrodes in an active area, produces an enhanced operational voltage window. The graphene may be 3D graphene. The electrolyte may comprise a high molarity salt. The electrodes may have an interdigitated geometry.

25 Claims, 14 Drawing Sheets

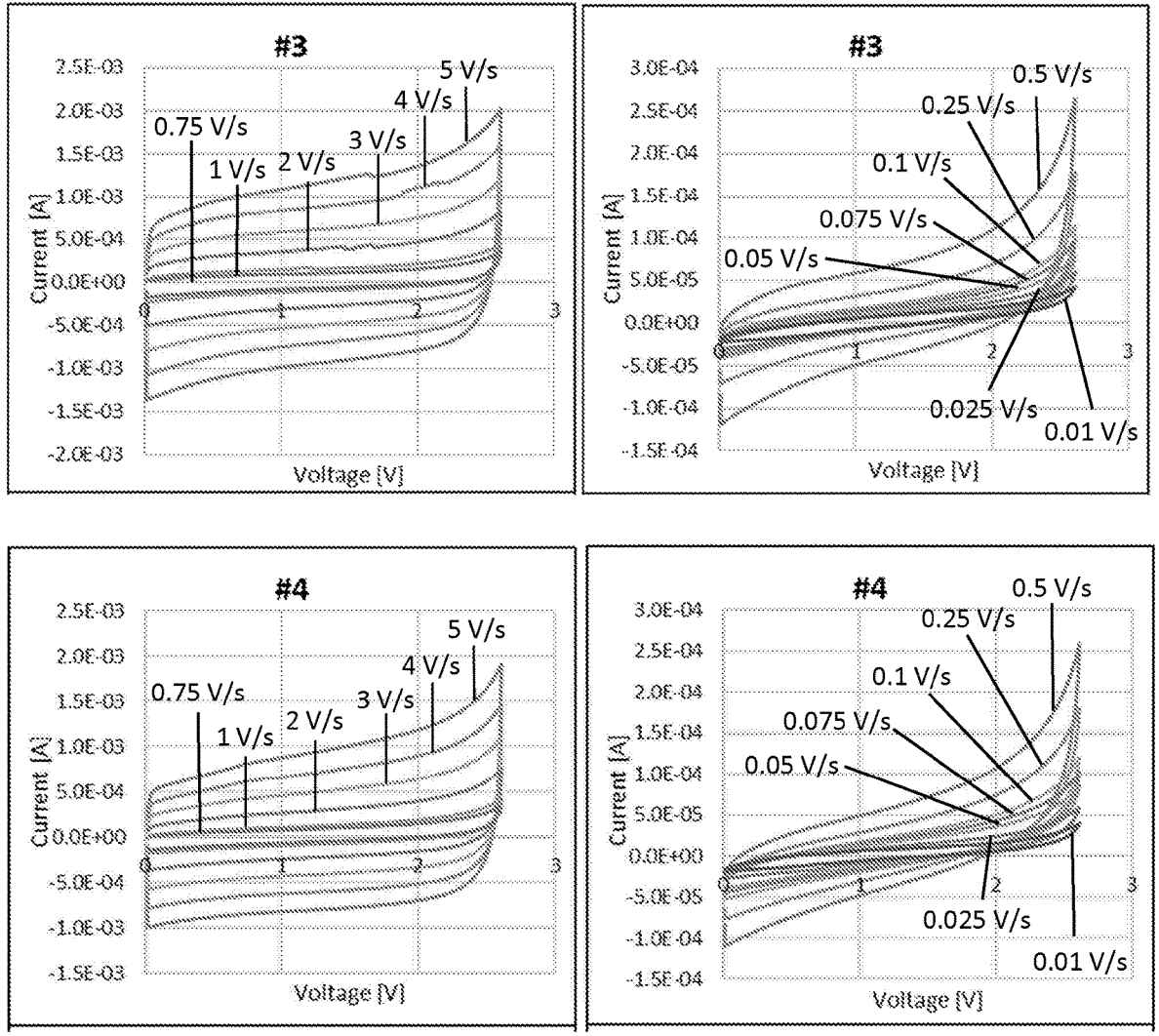
Fig. 9 (continued I)

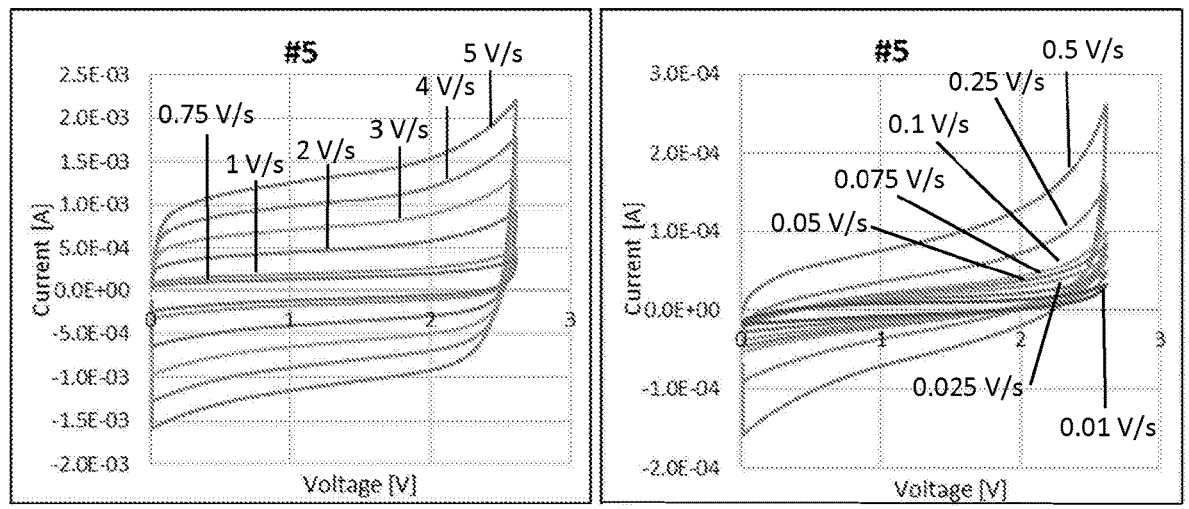
Fig. 9 (continued II)

FLEXIBLE SUPERCAPACITOR WITH GRAPHENE ELECTRODES EMBEDDED IN HYDROGEL ELECTROLYTE

CROSS-REFERENCE TO RELATED APPLICATIONS

This application claims the priority of International Application No. PCT/GB2021/052690, filed Oct. 18, 2021, which claims priority to GB Application No. 2016447.1, filed Oct. 16, 2020, the entire contents of which being fully incorporated herein by reference.

FIELD OF THE INVENTION

The invention relates to a supercapacitor.

BACKGROUND TO THE INVENTION

A supercapacitor is a device which stores electrical charge. In terms of its make up and function, a supercapacitor lies between an electrolytic capacitor and a rechargeable battery.

The properties of a supercapacitor make it superior over a rechargeable battery in applications where short charging times are required and also in applications where numerous charge/discharge cycles are used. Shortcomings of a supercapacitor over a battery include a lesser capacity to store energy over a long period of time.

Operational limitations of a supercapacitor are imposed by the material properties of the components. In particular, the maximum voltage at which a supercapacitor can operate, i.e. to which it can be charged, is dependent on the stability of the electrolyte and/or the electrodes. The maximum voltage of a capacitor is an important parameter, particularly so as the amount of energy stored by a capacitor is proportional to the square of the voltage. A supercapacitor with an organic electrolyte generally supports a higher voltage than one with an aqueous electrolyte. By utilising an organic electrolyte, the supercapacitor designer may produce a device with a working range of 2.5 to 2.7 V. In contrast, aqueous electrolytes, although often preferable for reasons of reduced cost and reduced toxicity, generally produce a device with a lower working voltage range. Known symmetric aqueous supercapacitors are generally unable to support voltages higher than 1.3-1.5 V. If electrodes of different materials are used, this voltage limit may reach 1.8-2.0 V. The limitation for an aqueous based supercapacitor is due to the electrolysis of water which in principle occurs when it is exposed to a potential difference of 1.23 V. In practice however in order to overcome the effect of overpotential a larger potential difference is required before electrolysis occurs.

Electrodes based on carbon have been associated with supercapacitors since the early days of their development. Initially carbon was of interest as an electrode material because it provided the possibility to manufacture electrodes with large surface areas. It was only later in the development of supercapacitor devices that the importance of the so-called double layer at the electrode surfaces was realised. This complex and often ill-understood phenomenon, which is linked to the use of carbon as an electrode material, is at the heart of the high capacitance values associated with supercapacitors. Supercapacitor devices which comprise carbon-based electrodes are considered to involve a double layer at the electrode surface, and the energy is stored electrostatically. Such supercapacitors are referred to as electrostatic double-layer capacitors, or EDLCs.

Other categories of supercapacitor exist. Electrochemical pseudocapacitors utilise metal oxide electrodes or conducting polymer electrodes. In contrast to the electrostatic charge storage mechanism of EDLCs, the charge storage in a pseudocapacitor is largely electrochemical. A third type of supercapacitor is the hybrid capacitor. A hybrid capacitor has asymmetric electrodes. One electrode is typically of carbon and has an electrostatic charge storage character; the other electrode is typically a lithium containing or a lithium doped material, which exhibits mainly electrochemical charge storage character.

Conventionally a supercapacitor can be thought of and is modelled as a series connection of two capacitors, one associated with each electrode. Each capacitor is positioned at the interface between electrode and the electrolyte, and is formed from the supercapacitor electrode, a dielectric layer formed from solvent molecules present in the electrolyte (called the inner Helmholtz plane), and a layer of charge carriers supplied by the electrolyte as counter-charges to charge on the electrode (called the outer Helmholtz plane). This triple structure of electrode, inner Helmholtz plane and outer Helmholtz plane forming a capacitive system at each electrode is referred to as the double layer, or electrical double layer.

SUMMARY OF THE INVENTION

A first aspect of the invention provides a symmetric supercapacitor device comprising: two electrodes, wherein each electrode comprises graphene; and a hydrogel electrolyte enveloping the electrodes in an active area.

The present inventors have found that a symmetric supercapacitor device according to the above combination of features produces an enhanced operational voltage window. Referring to the device as symmetric means that the electrodes comprise, and may be composed of, the same material. The graphene may be 3D graphene. The graphene may take the form of a 3D graphene foam.

The operational voltage window, or window of operation, of a supercapacitor is a key parameter of such a device and is determined by the breakdown voltage of the electrolyte. For an aqueous electrolyte-based supercapacitor, the breakdown of water is generally responsible for limiting the operational voltage window.

Although the reasons for the unexpectedly large operational window observed with the presently disclosed device are not understood in detail, and without any constraint to theory, it is apparent that the exceptional properties of the present invention are a consequence of the combination of graphene electrodes and the electrolyte, and in particular a consequence of the interface between these elements.

The large operational window of the present device equates in electrochemical terms to an unexpectedly large overpotential at the electrode. The overpotential is the potential difference beyond the thermodynamic redox potential for a particular reduction/oxidation reaction which is required for that reaction to occur. Overpotential is generally an ill-understood phenomenon, partly because there are many factors which contribute to it. For example, the overpotential is dependent on the electrode material, on the electrode morphology, and on the nature of the electrolyte. In the present invention the large surface area presented to the electrolyte by the graphene electrodes is thought likely to play a role in the device performance. How ions diffuse to the electrode surface from the bulk of the electrolyte and the associated depletion of charge carriers at the electrode surface is known to have an effect on overpotential. This may play a role in the present device. Diffusion rates of charge carriers in the electrolyte may be affected by the presence of hydrated ions which are larger in size than un-hydrated ions. There may also be effects on the overpotential arising from the interaction between the charge carriers and the morphology of the graphene electrode. The presence of the hydrogel polymer is thought also to have an effect, possibly steric and related to the graphene morphology, on the diffusion of charge carriers to the electrode surface.

A hydrogel is a gel in which the liquid constituent is water and which may be formed from a network of polymer chains. A supercapacitor in which the dielectric is formed by a hydrogel electrolyte would be expected to have the performance characteristics associated with an aqueous electrolyte-based supercapacitor. Against this expectation however, the present inventors have found that the performance of a supercapacitor according to the first aspect of the invention, i.e. a symmetric device, wherein the electrodes are of the same material, these electrodes comprising graphene and being enveloped in a hydrogel electrolyte, outstrips that expected of an aqueous based device. The operational voltage window of the device of the present invention is unexpectedly enhanced over an aqueous electrolyte-based device. The window of operation is more akin to an organic solvent-based supercapacitor.

Polyvinyl alcohol (PVA), polyvinylpyrrolidone (PVP), sodium polyacrylate, acrylate polymers and copolymers with an abundance of hydrophilic groups are examples of polymers which may be utilised in hydrogels. Fluorinated hydrogels may be used. The combination of a hydrogel and ionic charge carriers helps to achieve the surprisingly large window of operation achieved by the present invention.

The electrodes of the device presently disclosed are situated on the substrate and the electrolyte is present on top of the electrodes in a manner which seals at least part of the electrode structure, thus forming an active area. The active area of the supercapacitor is an area of the supercapacitor comprising electrolyte and electrodes in which charge is stored.

The electrodes of the device may have an interdigitated geometry, i.e. they may be interdigitated. An interdigitated electrode geometry helps to maximize the capacitance of the supercapacitor. An interdigitated electrode geometry additionally enables a device without a separator. Supercapacitors normally include a separator between oppositely facing electrodes to prevent short circuiting between the electrodes. The absence of a separator eases construction of a supercapacitor device. A separator may also have negative effects on device performance, for example by inhibiting charge flow leading to lowered charge/discharge rates. The absence of a separator avoids these negative performance effects.

An interdigitated electrode geometry is well suited to a symmetric device. It is clearly more complicated to construct an interdigitated electrode geometry structure if the materials of the opposing electrodes are different than if the electrodes are of the same material. If the electrodes are of the same material, then the electrodes can be manufactured, possibly in situ, in one method step. If different electrode materials are used, then a plurality of manufacture steps are required, greatly complicating the process of manufacture.

The absence of a separator additionally removes any negative effects that a separator may have on device performance, for example inhibition of charge flow leading to lowered charge/discharge rates.

The hydrogel electrolyte may comprise a concentration of charge carriers which is sufficiently high to produce said enhanced operational voltage window.

It may be that the enhanced operational voltage window is dependent on the concentration of charge carriers.

The charge carriers may have a redox potential supporting the enhanced operational voltage window.

The charge carriers may be provided by an aqueous solution of an acid, by an aqueous solution of an alkali, or by an aqueous solution of a salt. Acids which may be used include sulphuric acid. Alkalis which may be used include potassium hydroxide.

The hydrogel electrolyte may comprise a mixture of a hydrogel and a salt. The electrolyte may be composed of a hydrogel, whose hydrogeling polymer may be for example PVA or PVP. The salt may be, for example, $NaClO_4$ or $NaNO_3$ or $Mg(ClO_4)_2$. The molarity of the salt may be for example 0.5 M or greater, for example 1 M or greater, for example 2 M or greater, for example 2.5 M or greater, for example 3 M or greater, for example 4 M or greater, for example approximately 5 M. The molarity of the salt may be for example between 1 M and 10 M, or it may be for example between 2.5 M and 7.5 M.

Salts which may be used include phosphonium salts, perchlorate salts, nitrate salts and arsenate salts. Examples of salts include sodium sulphate, sodium disulphate, sodium persulphate, sodium perchlorate, lithium perchlorate, magnesium perchlorate, sodium nitrate, lithium hexafluoride arsenate. Aqueous solutions of these salts may be used in the electrolyte to provide ionic carriers.

The charge carriers may be ions. The charge carriers may be hydrated ions.

A hydrated ion is an ion in an aqueous environment. Polar water molecules arrange themselves around the ion forming a hydration sphere centred on the ion. The details of the mechanism behind the surprisingly wide enhanced operational voltage window observed with the present invention are ill understood and the inventors do not wish to be constrained by theory. Nevertheless, the surprising advantageous properties of the present device are the result of a synergy between the electrode and the dielectric materials. The enhanced performance is an expression of a lack of water splitting under voltage conditions where the person skilled in the art would expect electrolysis to occur. It is expected that the interface between the electrode and the electrolyte lies at the origin of its performance. It is possible that there is a synergetic interaction between the size of the charge carriers, possibly hydrated, and the size of pores present in the electrodes. A hydrogel comprises a network of polymer chains and this chain network of the hydrogel may also have a physical (steric) effect which limits the exposure of water molecules to potential difference which can cause their splitting.

The increased size of hydrated ions is thought to combine with the porous structure of the graphene electrode to hinder diffusion close to the electrode surface, with the consequence that the overpotential is increased.

The electrodes of the symmetric supercapacitor device may comprise porous graphene. The electrodes may comprise graphene foam. Optionally the electrodes may comprise no additional binder material.

Porous graphene (or graphene foam) electrodes are believed to combine with the charge carriers in the electrolyte to increase the overpotential and thereby enhance the operational window of the supercapacitor.

The electrodes may comprise 3D graphene. 3D graphene is alternatively known as porous graphene, a name which makes reference to its porous structure, or laser induced graphene, a name which makes reference to one method of producing this type of graphene.

3D graphene consists of one or more 2D graphene sheets (each sheet being a layer of sp2 bonded carbon) folded back on one another to form a three-dimensional structure rather than a planar sheet. 3D graphene lacks the regular AB stacking of planar graphene sheets found in graphite or multilayer 2D graphene. A 3D graphene material is typically porous. 3D graphene has a high surface area. The porosity of the 3D graphene and as a result the surface area of 3D graphene can be controlled by varying parameters of the growth method. This has the advantage that the porosity of the electrodes of the device of the invention can be controlled during a manufacturing process of the electrodes.

The graphene electrodes may be on a substrate. The graphene electrodes may be on a polyimide substrate. The polyimide substrate may be Kapton. The substrate may form a substrate of the supercapacitor device. The substrate may be sufficiently thin so as to be flexible, resulting in a supercapacitor device which is flexible. It may be that the substrate comprises (e.g. is formed from) one or more of the following materials: polyimides (for example, poly(4,4'-oxydiphenylene-pyromellitimide), otherwise known as Kapton), polyetherimides (PEI), poly(methyl methacrylate) (PMMA) (e.g. spray-coated PMMA), polyurethanes (PU), polyesters, vinyl polymers, carbonized polymers, photoresist polymers, alkyds, urea-formaldehyde.

These substrate materials can be utilised as a source of carbon which is transformed to graphene. Production of graphene in this way can be achieved by irradiating a polyimide substrate (for example) with radiation, for example laser radiation. This produces graphene which is chemically fixed to the substrate from which it is produced, resulting in a robust structure. The electrodes are thus produced in situ by using part of the substrate as a carbon source, i.e. as a reagent for producing graphene. The structure can at the same time as being robust be flexible. A flexible device is advantageous in many respects. A device which is flexible can be advantageously packaged, for example by rolling it up. A device which is flexible can also be attached to surfaces of curved structures, for example.

The substrate may be substantially planar. The substrate may be a film, for example a thin film. The substrate may have a thickness of greater than 5 μm. The substrate may have a thickness of less than 120 μm. The substrate may have a thickness of between 5 μm and 120 μm. The thickness of the substrate may be substantially uniform across the surface of the substrate. The substrate may be flexible. The substrate may be pliable.

The substrate may be a polyimide tape (e.g. a Kapton tape) having a first surface and a second surface.

The electrodes may be mass balanced to optimise the operational voltage window.

A supercapacitor can be considered as two capacitors connected together in series. To maximise the capacity of the supercapacitor, the capacity of the two constituent capacitors should be equal. This can be engineered by adjusting the surface area of the individual electrodes, thus compensating for other factors contributing to the capacity, such as the nature of the solvated ions. This process of adjusting the individual electrodes is called mass balancing. Mass balancing of the electrodes has the advantage that the capacity of the superconductor device can be maximised and the lifetime of the supercapacitor can be extended.

In a second aspect, the present invention provides a method of manufacturing a symmetric supercapacitor device according to the first aspect, whereby:

the electrodes are formed on a substrate;
an electrolyte precursor comprising charge carriers and a hydrogel is applied to the electrodes;
the electrolyte is formed from the precursor, causing the electrodes to be embedded in the electrolyte in an active area.

Electrodes of graphene may be made by converting part of the substrate (if said substrate is or comprises a carbon source) to graphene, or by using chemical or physical deposition methods, such as physical vapour deposition (PVD), chemical vapour deposition (CVD), molecular beam epitaxy (MBE), sputtering, laser induced growth, pulsed laser deposition, cathodic arc deposition, spin coating, dip coating or sol-gel methods. In this way, the electrodes are produced on the substrate in situ.

The electrolyte precursor may be prepared by preparing an aqueous solution of charge carriers and by mixing this aqueous solution with a hydrogel. The electrodes may be formed using laser radiation.

When preparing the electrolyte precursor the undesirability of precipitation or crystallisation of the salt in the electrolyte should be kept in mind. Precipitation of salt, or any solid, from the electrolyte may lead to cracking of the device, or to other defects of the device, or defects in the performance of the device. This places an upper limit on the concentration of the salt solution. It may be advantageous to avoid using a supersaturated solution of salt. The precise upper concentration limit may depend on the particulars of the chemicals present. For sodium perchlorate, the inventors have found that a concentration of 5 M produces an electrolyte which avoids precipitation or crystallisation of the salt and also, in combination with the other features of the invention, gives a supercapacitor device with an operational window beyond that which would be expected from a consideration of the individual components. The electrolyte may comprise a salt solution with a concentration of greater than 4 M. The electrolyte may comprise a salt solution with a concentration of greater than 3 M, or greater than 2 M, or greater than 1 M, or greater than 0.5 M.

At higher concentrations, salt was observed to readily precipitate from the electrolyte gel, and too quickly for a viable device. This precipitation may be caused by evaporation of water. Water loss through hydrolysis may be another cause. In any case, the inventors found that although an electrolyte gel could be formed using concentrations of sodium perchlorate up to 16.5 M, the problem of precipitation was observed at all concentrations upwards of 10 M.

When manufacturing the hydrogel electrolyte, a high molar solution of salt may be used.

Smaller concentrations of salt solution are generally advantageous for cost reasons.

The graphene layer may be between 10 μm and 100 μm thick. This facilitates a flexibility in the device. The device may be rolled up to become more compact.

A gap of between 100 μm and 1000 μm may separate the electrodes from each other. The capacity of the device has a dependency on the gap between the electrodes and consequently regulation of this gap affects the amount of charge which can be stored.

The operational window of the present device may be greater than 1.5 V, or it may be greater than 2 V, or it may be greater than 2.5 V.

Optional and preferred features of any one aspect of the invention may be features of any other aspect of the invention.

DESCRIPTION OF THE DRAWINGS

The present invention will now be illustrated with reference to the following Figures in which.

DETAILED DESCRIPTION

Two-Electrode Supercapacitor

Figure 1:
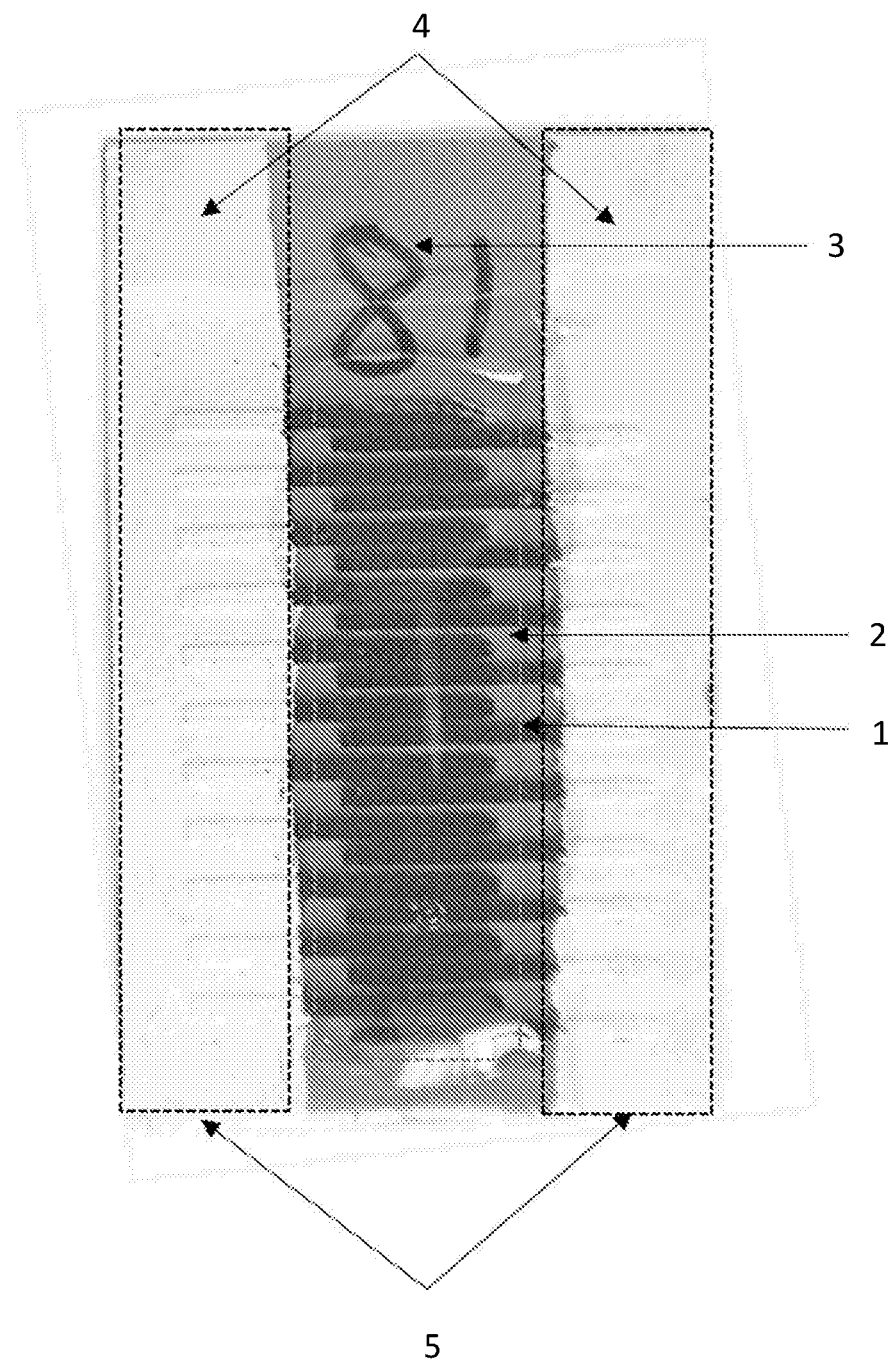
FIG. 1 shows a prototype supercapacitor according to the present invention.

FIG. 1 illustrates the main features of an example supercapacitor device according to the present invention. A Kapton substrate (3) supports the supercapacitor electrodes which are composed in this example of graphene and which are arranged in an interdigitated comb geometry, and which form an interdigitated electrode structure (1). A silver current collector (5) runs down each side of the device serving to electrically unify each opposing electrode. The non-substrate sides of the interdigitated electrode structure is enveloped in a hydrogel (2). It is possible to add a Kapton lid to contain the hydrogel, or otherwise package the device in a suitable manner.

The graphene electrodes may be formed on the Kapton substrate. In the sensor illustrated in FIG. 1 a method similar to that disclosed in WO 2019/038558 was utilised. By exposing a suitable substrate, being one which provides a source of carbon, in this example a Kapton substrate, to a laser beam, laser induced graphene is created on the substrate. Laser induced graphene produced in this way grows out of the substrate and is adhered to the substrate. The substrate and a graphene electrode formed in situ in this manner form one body.

The graphene electrodes of the sensor illustrated in FIG. 1 were produced using an infrared CO2 laser under ambient conditions. The substrate was commercial Kapton film with a nominal thickness of 127 microns. In the illustrated embodiment, eleven parallel strips of graphene were produced for each electrode. This number can clearly be varied. The graphene strips for the positive electrode are offset from the graphene strips for the second electrode, thus forming the interdigitated structure.

The electrode dimensions of the device of FIG. 1 are as set out in Table 1.

| Mass balance ratio | 1.18 |
|---|---|
| Positive half-cell 'electrode fingers' | |
| Length (cm) | 0.4 |
| Width (cm) | 0.0472 |
| Thickness (cm) | 0.005 |
| Number of fingers | 11 |
| Total Area exposed (cm$^2$) | 0.20768 |
| Negative half-cell 'electrode fingers' | |
| Length (cm) | 0.4 |
| Width (cm) | 0.04 |
| Thickness (cm) | 0.005 |
| Number of fingers | 11 |
| Total Area exposed (cm$^2$) | 0.176 |
| Distance between fingers (cm) | 0.04 |
| Total active electrode surface area (cm$^2$) | 0.38368 |
| Total active electrode volume (cm$^3$) | 0.0019184 |

Figure 2:
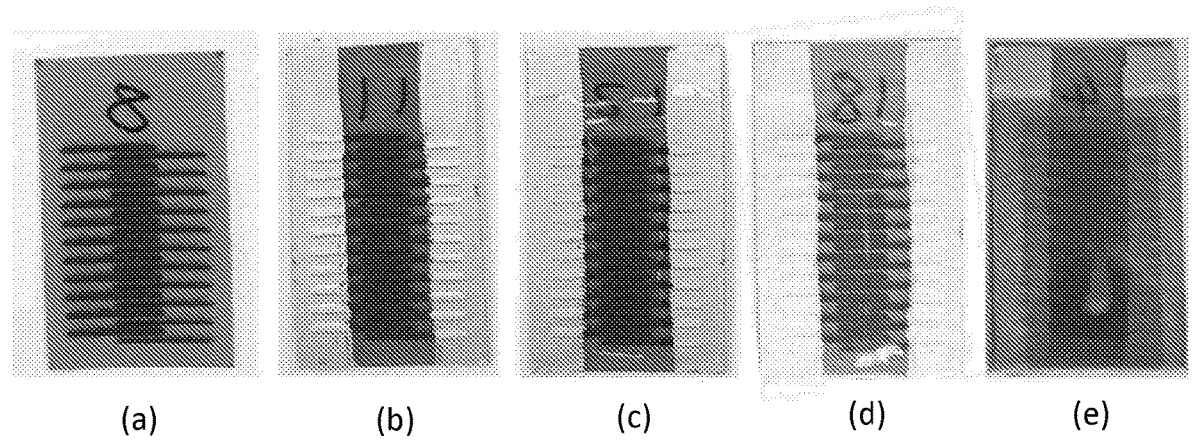
FIG. 2 illustrates a prototype supercapacitor according to the invention after five different stages of manufacture of (a) Kapton substrate with graphene fingers following laser synthesis; (b) following the application of silver ink to electrically connect the positive and negative electrodes; (c) following deposit of epoxy on the silver ink leaving only an active area of the device exposed; (d) following application of the hydrogel electrolyte on the active area of the device; (e) following application of a Kapton lid to contain the electrolyte.

FIG. 2(a) illustrates the device at a stage of manufacture following laser synthesis of the graphene fingers.

FIG. 2(b) illustrates the device following application of the silver ink to link together the fingers of each electrode. After application of the silver ink the device is dried by placing the unit on a hot plate at 120° C. for 5 minutes.

FIG. 2(c) illustrates the device following the application of epoxy onto the silver ink for electrical isolation, leaving the interdigitated graphene fingers and what will be the active area of the supercapacitor exposed. The epoxy is fully cured in air.

FIG. 2(d) is an image of the device following application of the electrolyte to envelope the exposed interdigitated graphene electrodes. Details of the electrolyte preparation are given below.

FIG. 2(e) is an image of the supercapacitor once a Kapton lid to contain the electrolyte within the active area has been applied.

Three-Electrode Device

Figure 3:
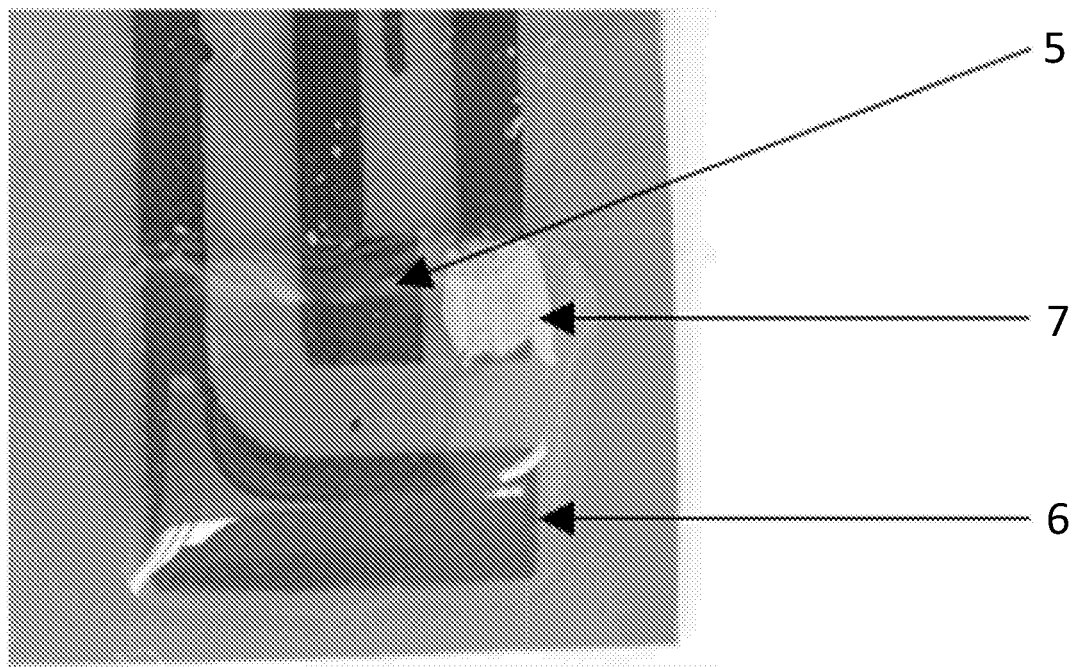
FIG. 3 illustrates the three-electrode device including a Ag/AgCl reference electrode. Each of a working, counter and reference electrode is on a substrate and a hydrogel electrolyte encapsulates the surfaces of the electrodes which are not in contact with the substrate.

In addition to the two-electrode supercapacitor device, a three-electrode test device additionally comprising a reference electrode was also fabricated. The three-electrode device is illustrated in FIG. 3. The three-electrode device comprises a working electrode (5), a counter electrode (6) and a Ag/AgCl reference electrode (7). Each of the working electrode and the counter electrode is made from 3D graphene, produced in this particular embodiment by laser illumination of a Kapton substrate. This device is used to determine the voltage range within which the NaClO$_4$ hydrogel electrolyte is stable. The three-electrode device was left to stabilise for at least one hour following fabrication before any measurements were performed.

Preparation of the Hydrogel Electrolyte

Each of the two-electrode and the three-electrode devices disclosed is based on a 5 M solution of sodium perchlorate and the electrolyte was prepared in the manner now described.

A 5 M solution of sodium perchlorate was prepared by dissolving sodium perchlorate (98% purity from Sigma-Aldrich) in deionised water (quantities used: 3.061 g of $NaClO_4$ was dissolved in 5 ml deionised H2O). The sodium perchlorate solution was then stirred with a magnetic stirrer on a hot plate at 120° C. while polyvinyl alcohol (PVA, 99% hydrolyzed, Sigma-Aldrich) was added. For every 10 mL of solution, 1.5 g of PVA was dissolved.

The mixture of sodium perchlorate solution and PVA was removed from the hot plate and allowed to cool, whereupon it forms a white opaque gel-like solution. The gel solution is then heated to 120° C., until it liquefies and turns clear. It is then deposited onto the graphene electrodes.

After deposition on the electrode surfaces, the liquified hydrogel electrolyte material solidifies in approximately 5 minutes at room temperature.

The quantity of electrolyte which is deposited on the electrodes depends on the surface area to be covered. For the device illustrated in FIG. 2, 150 μL of electrolyte were deposited.

Experimental Results from the Three-Electrode Device

The performance which is obtainable from a supercapacitor is ultimately limited by the stability of the electrolyte.

To test the electrolyte stability in the present system, several experiments were run using the three-electrode device herein described. Differential pulse voltammetry (DPV) was initially used to select which voltage windows were investigated by cyclic voltammetry (CV) and galvanostatic charge discharge (GCD) measurements.

i Cyclic Voltammetry

Cyclic voltammetric measurements were carried out to determine the stability of the electrolyte. In a standard three electrode measurement the potential between the working and reference electrodes was swept at a constant rate from an open circuit potential (OCP; nominal 0 V) to a predetermined upper limit, before being swept down again. The current response at the working electrode was monitored during this time.

Figure 4:
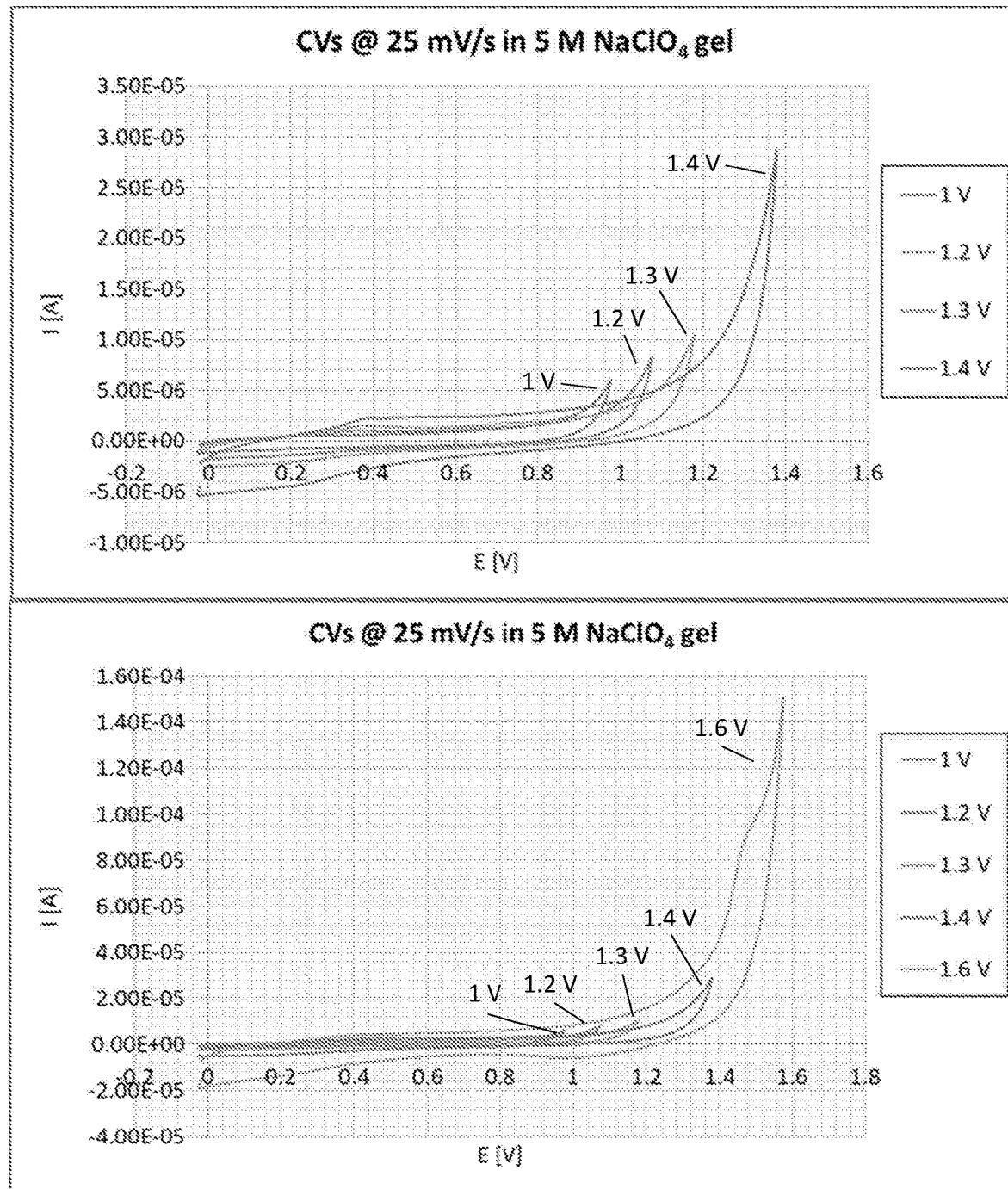
FIG. 4 presents cyclic voltammograms for positive voltages measured at 25 mV/s.
Figure 5:
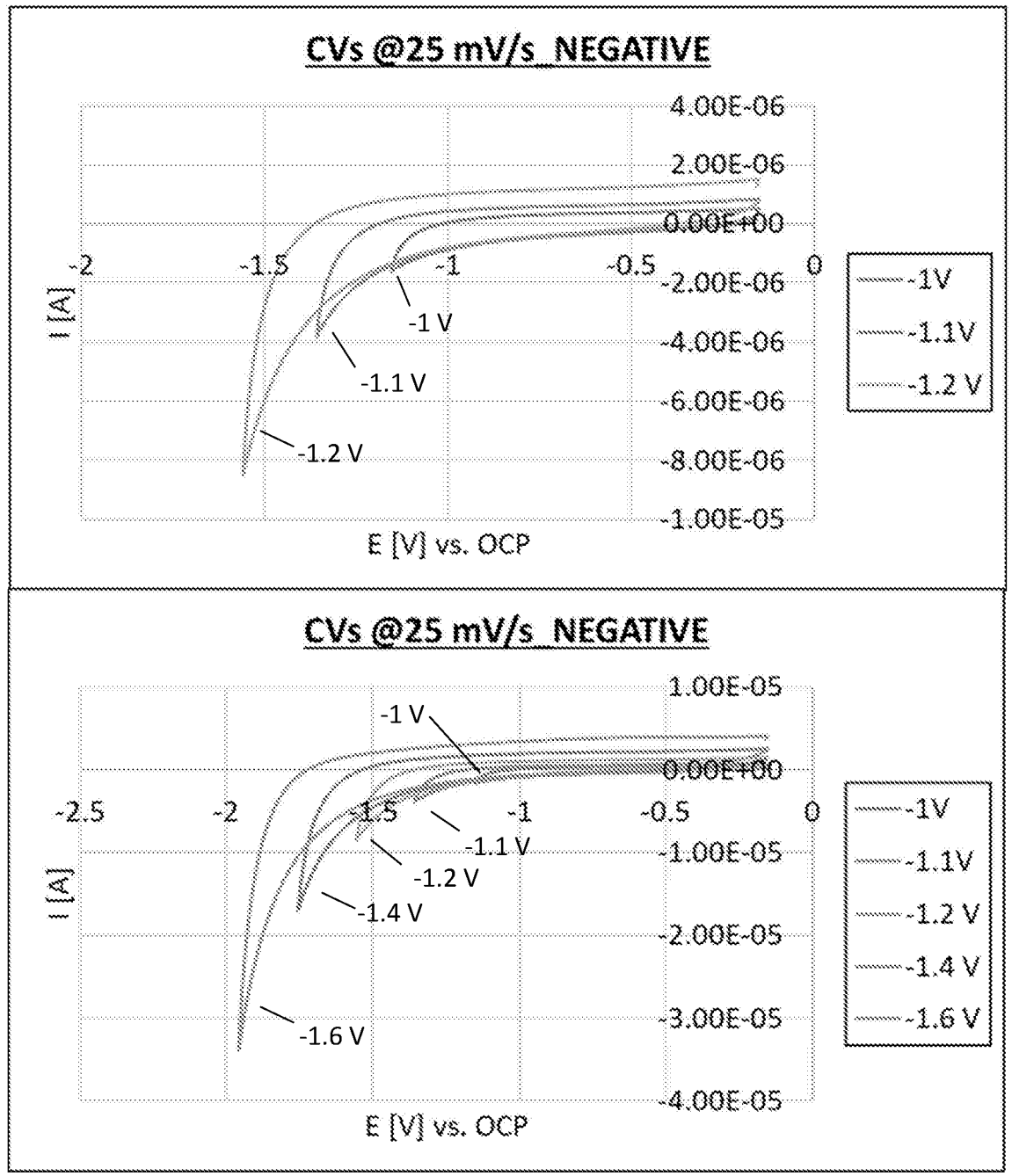
FIG. 5 presents cyclic voltammograms for negative voltages measured at 25 mV/s.

Results of these measurements are shown in FIGS. 4 and 5. FIG. 4 shows results in which the voltage is scanned from OCP in a positive direction. The upper set of results shows four voltammograms of maximum potential 1 V, 1.2 V, 1.3 V and 1.4 V. The lower set of results additionally includes a voltammogram of maximum potential 1.6 V. As the upper voltage limit increases beyond 1.2 V the shape of the cyclic voltammogram becomes less "square-like". The tail which becomes increasingly prominent as the end scan voltage becomes larger is indicative of electrolyte degradation, probably due to electrolysis of water. These voltammograms indicate that the electrolyte is stable up to +1.2V.

FIG. 5 shows a similar set of results but taken for negative voltages. These data suggest that the electrolyte is stable to −1.4 V.

Taken together, the data in FIGS. 4 and 5 give a working window for the device of 2.6 V. This is considerably higher than anything expected from using a water-based electrolyte.

Ii Galvanostatic Charge Discharge (GCD) Data

Figure 6:
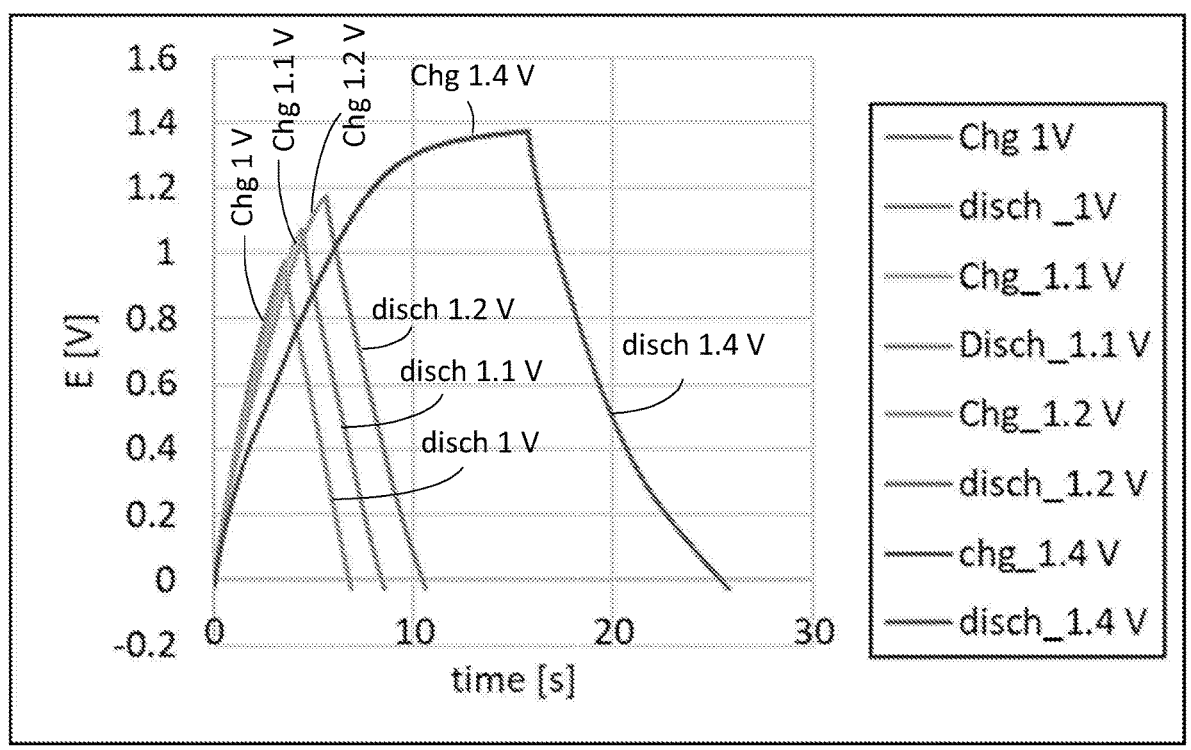
FIG. 6 presents galvanostatic charge discharge (GCD) curves measured at 0.5 mA/cm$^2$ for positive voltage windows.
Figure 7:
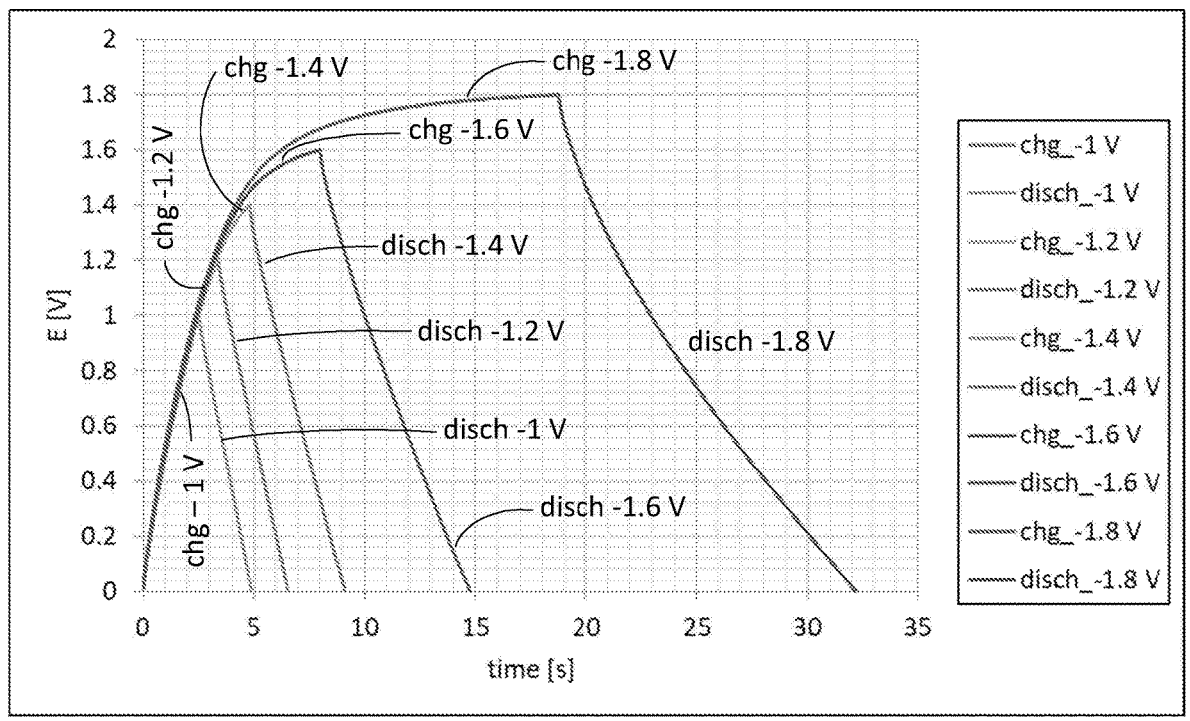
FIG. 7 presents galvanostatic charge discharge (GCD) curves measured at 0.5 mA/cm$^2$ for negative voltage windows.

Galvanostatic charge discharge (GCD) measurements were performed to determine coulombic efficiency from charge and discharge times. In these measurements a current is applied between the counter and working electrodes, and the voltage response of the working electrode (with reference to the reference electrode) is measured. GCD curves measured using a discharge current of $2\times10^{-5}$ A (0.5 mA/cm²) for selected voltage windows are shown in FIG. 6 for positive voltages. The curves plateau beyond 1.2 V which indicates electrolyte degradation. GCD curves for selected negative voltage windows are shown in FIG. 7. Significant plateauing is seen for voltage windows up to −1.6 V and −1.8 V, indicating electrolyte degradation. A voltage window of −1.4 V has a triangular shaped GCD curve and indicating stability.

Results from the cyclic voltammetry measurements and from the galvanostatic charge discharge measurements on the three-electrode system are summarised in the following tables.

The first table summarises average coulombic efficiency, areal discharge capacitance and discharge energy data for positive voltage windows.

| EW [V] | Average Coulombic efficiency [%] | stdev [%] | Average Discharge areal capacitance [mF/cm²] | stdev [mF/cm²]] | Discharge Energy from GCD [J] |
|---|---|---|---|---|---|
| 1 | 93.9 | 0.91 | 1.59 | 5.66E−02 | 3.12E−05 |
| 1.1 | 91.7 | 1.32 | 1.69 | 6.23E−02 | 4.02E−05 |
| 1.2 | 87.8 | 1.30 | 1.82 | 7.53E−02 | 5.17E−05 |
| 1.4 | 54.9 | 7.04 | 2.95 | 3.56E−01 | 1.14E−04 |
| 1.6 | 25.3 | 2.71 | 9.60 | 1.32E+00 | 4.05E−04 |

The second table summarises average coulombic efficiency, areal discharge capacitance and discharge energy data for negative voltage windows.

| EW [V] | Average Coulombic efficiency [%] | Stdev | Average Disch. Areal Cap. [mF/cm²] | stdev | Discharge Energy from GCD [J] |
|---|---|---|---|---|---|
| −1 | 87.86 | 9.911 | 1.2970 | 0.311 | 2.65E−05 |
| −1.2 | 87.98 | 7.354 | 1.5103 | 0.577 | 3.84E−05 |
| −1.4 | 87.04 | 5.636 | 1.8482 | 1.012 | 5.72E−05 |
| −1.6 | 82.21 | 5.419 | 3.1486 | 2.598 | 1.30E−04 |
| −1.8 | 67.16 | 17.728 | 5.3844 | 4.637 | 2.88E−04 |

In these summary tables, the coulombic efficiency is the ratio of the stored and delivered energy measured in the second GCD cycle; the areal capacitance in mF/cm² is calculated by the following formula:

$$\text{Areal Capacitance} \left[\frac{mF}{cm^2}\right] = \frac{2 * E_{(dis)charge}[J]}{A_{geometric}[cm^2] * (EW)^2[V^2]} * 1000$$

and the discharge energy is the integral over time of the charge and discharge portions of the GCD curve.

The GCD curves, such as shown in FIGS. 6 and 7, indicate that +1.2 V and −1.4 V are realistic positive and negative voltage limits.

These values of voltage limits and areal capacitances allow a mass balance to be calculated according to the following formula:

$$\frac{m^+}{m^-} = \frac{C^- \Delta E^-}{C^+ \Delta E^+}$$

where m$^+$=mass of positive electrode, m$^-$=mass of negative electrode, C$^+$=capacitance (F) of positive electrode, C$^-$=capacitance (F) of negative electrode, ΔE$^+$=positive voltage window limit, ΔE$^-$=negative voltage window limit.

Experimental Results from the Two-Electrode Device—Supercapacitor Performance

Figure 8:
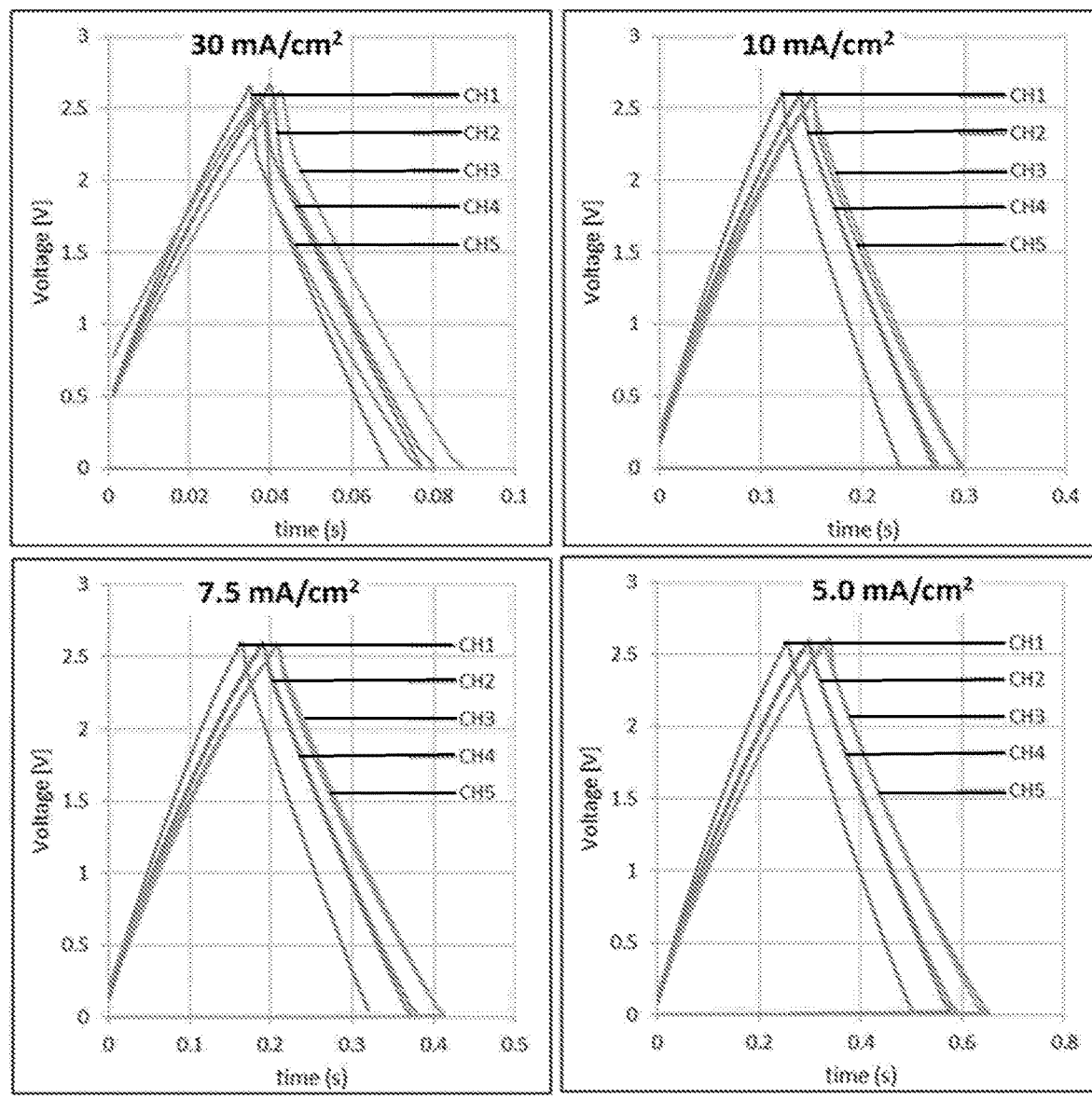
FIG. 8 presents galvanostatic charge discharge (GCD) data taken from five two-electrode devices.
Figure 8:
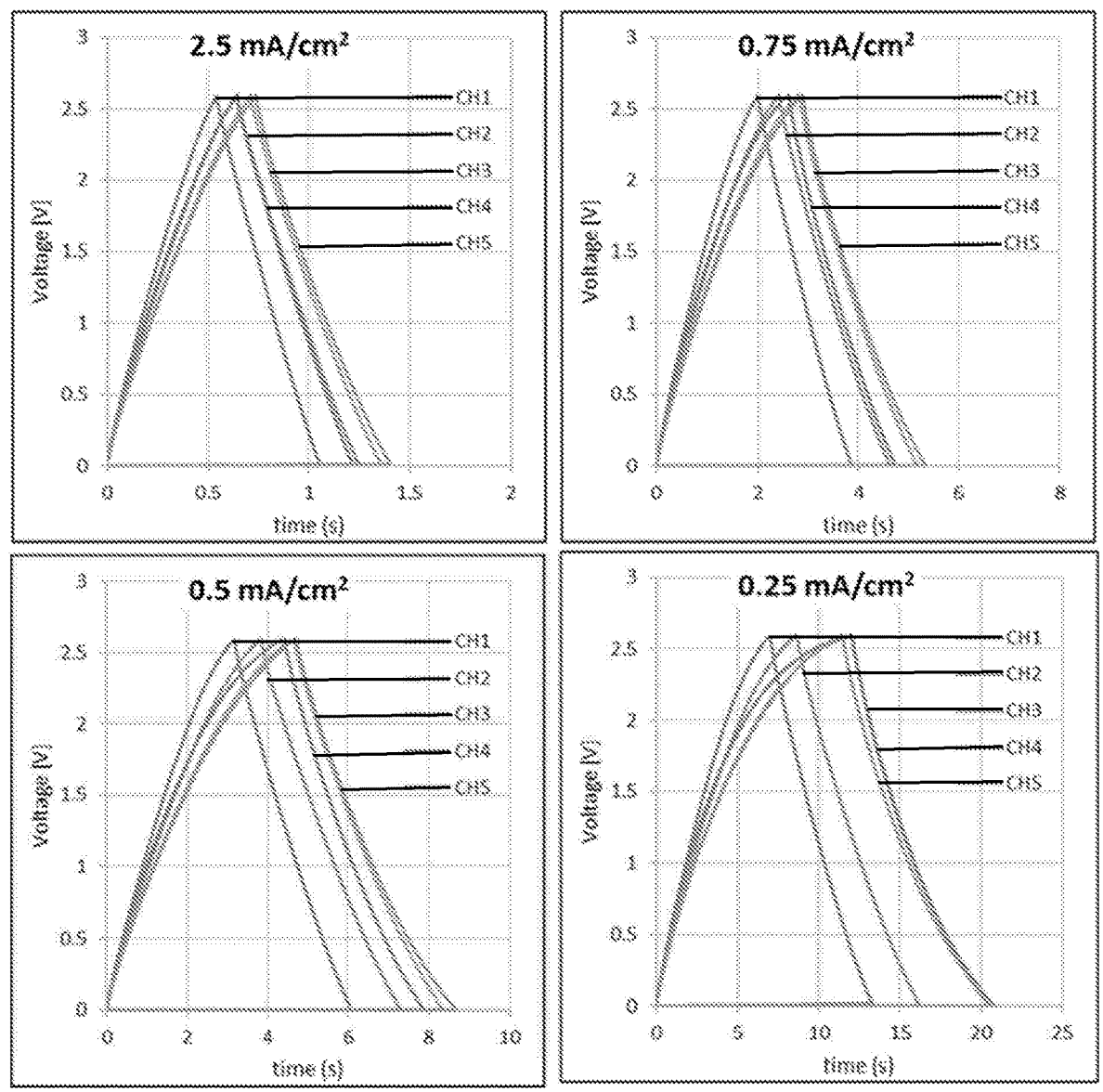

Galvanostatic charge discharge (GCD) data were collected for the two-electrode supercapacitor device for a range of applied current densities from 0.25 mA/cm$^2$ to 30 mA/cm$^2$. FIG. 8 plots GCD results taken from five different devices (CH1-CH5). A voltage window of 2.6 V is utilised to collect these data, with greater electrolyte stability being observed at higher current densities.

Figure 9:
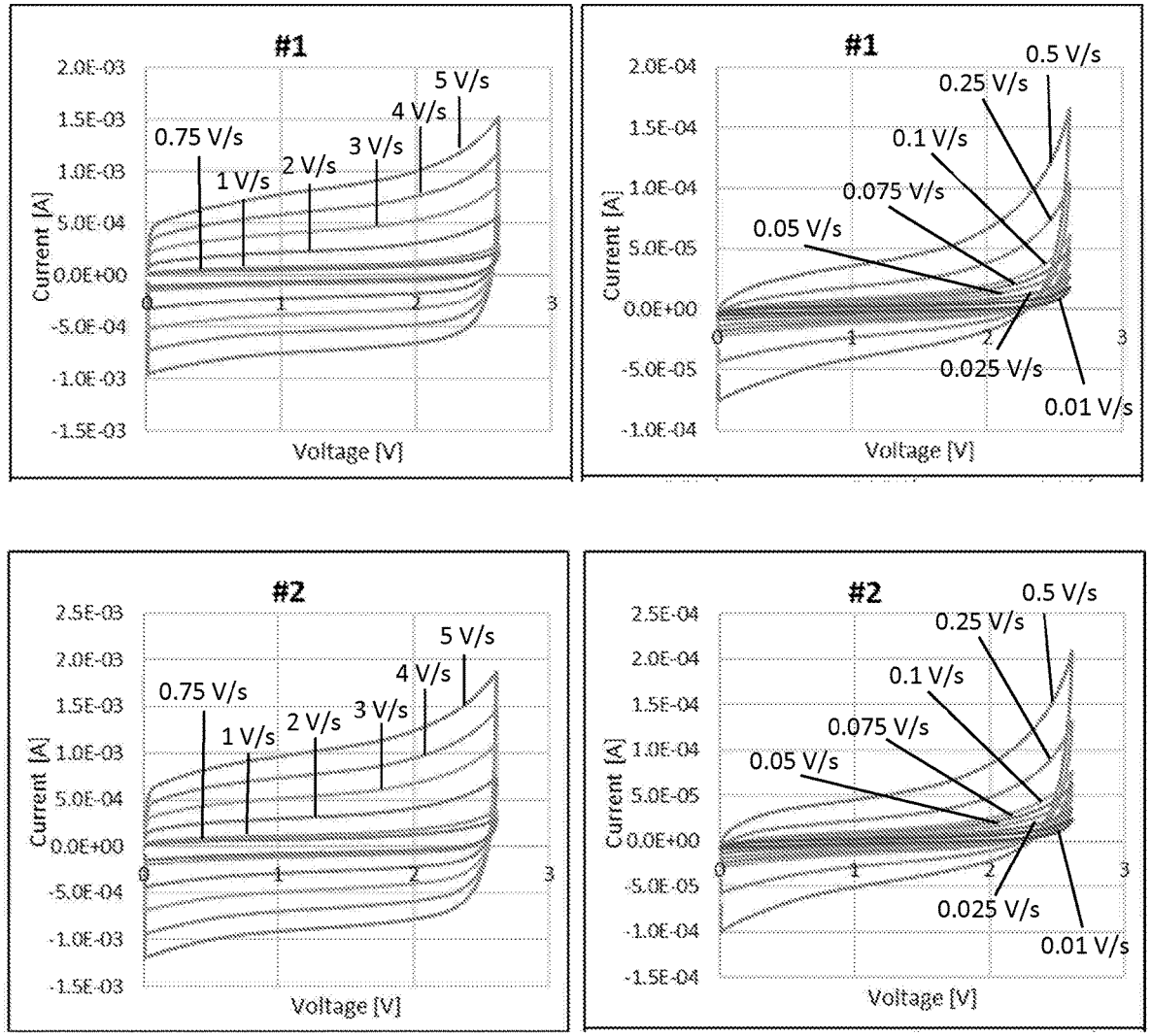
FIG. 9 presents cyclic voltammograms recorded from five different two-electrode devices at high (left) and low (right) scan rates.

Further performance data for the two-electrode supercapacitor are presented in FIG. 9, showing cyclic voltammograms recorded from five different devices (devices #1 to #5) according to the present invention at scan rates from 0.01 V/s to 5 V/s. The cyclic voltammograms in the right hand column were recorded at low scan rates (0.01 V/s, 0.025 V/s, 0.05 V/s, 0.075 V/s, 0.1 V/s, 0.25 V/s and 0.5 V/s) and those in the left hand column at high scan rates (0.75 V/s, 1 V/s, 2 V/s, 3 V/s, 4 V/s and 5 V/s). The trend shown in these data is to higher electrolyte stability at higher scan rates. In each set of cyclic voltammograms shown in FIG. 9, faster scan voltages result in larger differences in the current response between ramping the voltage up and ramping the voltage down.

In addition to the above disclosed devices, devices were constructed in a similar way but with the hydrogel electrolyte comprising (a) 3 M NaClO$_4$ and PVA, (b) 1 M NaClO$_4$ and PVA, (c) 2.5 M NaNO$_3$ and PVA, (d) 3 M Mg(ClO$_4$)$_2$ and PVA, and (e) 5 M NaClO$_4$ and PVP.

Figure 10:
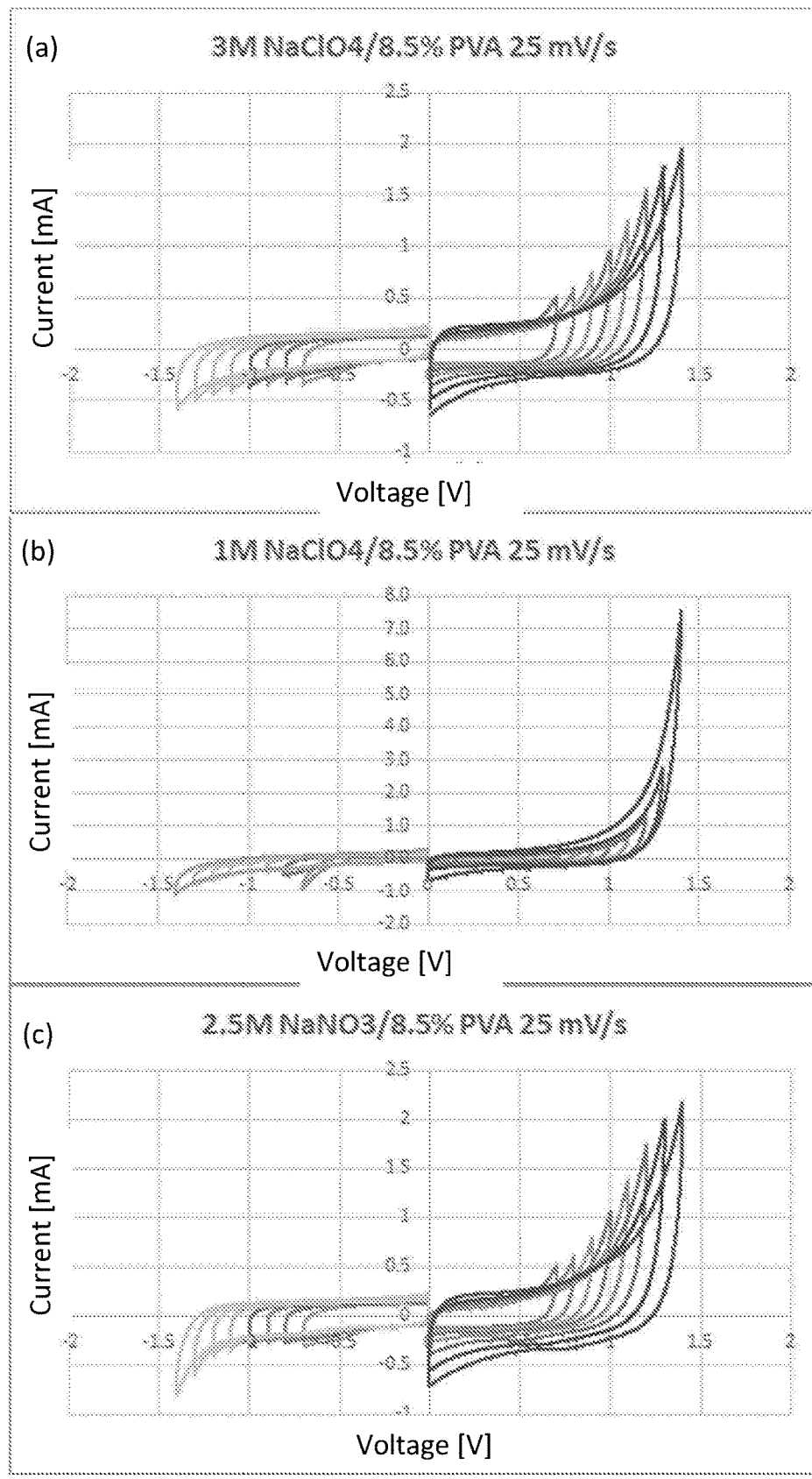
FIG. 10 presents cyclic voltammogram data for five additional systems, differing through the nature of the hydrogel electrolyte: (a) 3 M NaClO$_4$ and PVA; (b) 1 M NaClO$_4$ and PVA; (c) 2.5 M NaNO$_3$ and PVA; (d) 3 M Mg(ClO$_4$)$_2$ and PVA; and (e) 5 M NaClO$_4$ and PVP.
Figure 10:
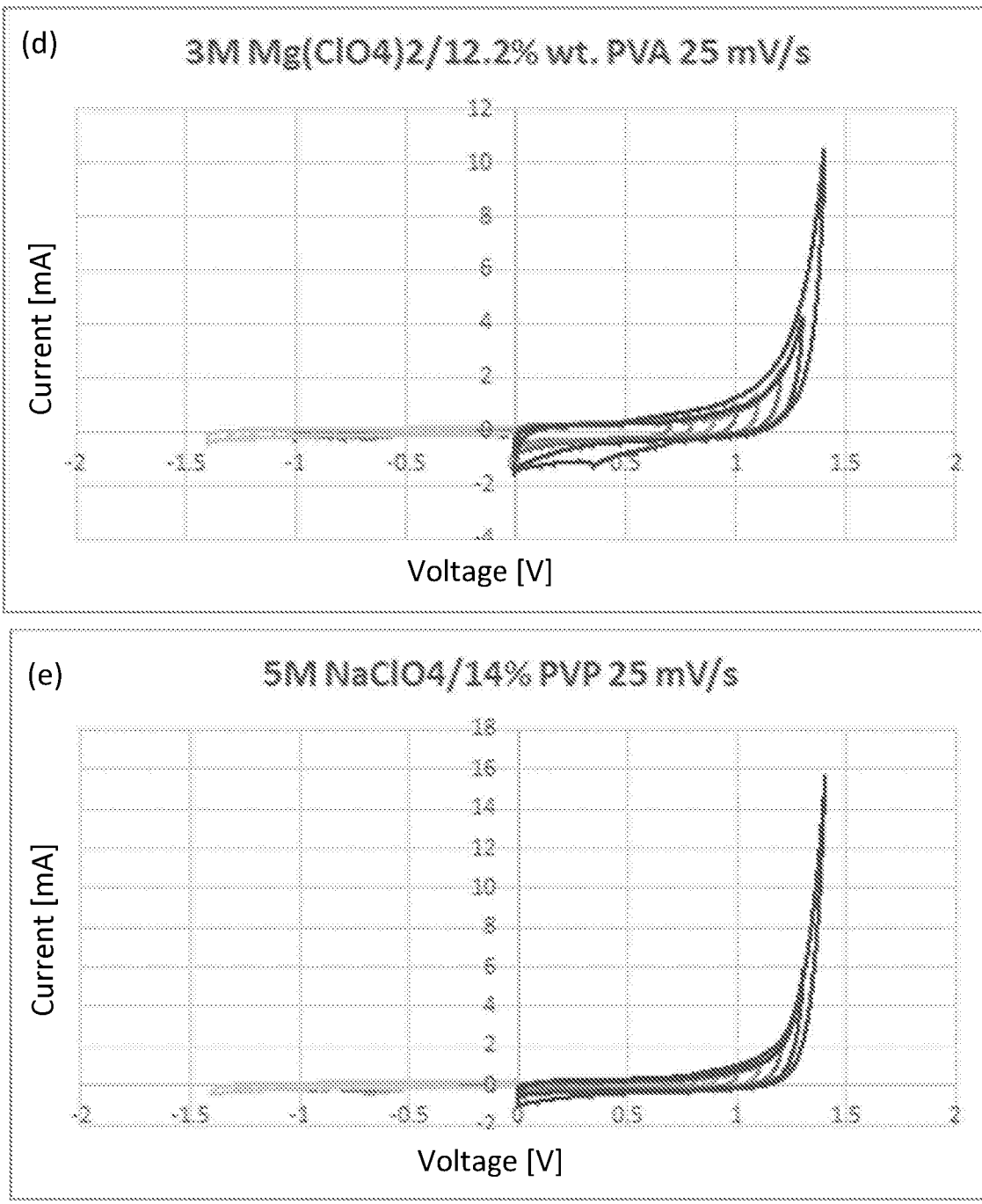

Cyclic voltammetric measurements on these additional devices are shown in FIG. 10. For each electrolyte a cyclic voltammogram was run between 0 V and 0.7 V; between 0 V and 0.8 V; between 0 V and 0.9 V; between 0 V and 1.0 V; between 0 V and 1.2 V; between 0 V and 1.3 V; and between 0 V and 1.4 V. Similarly, for each electrolyte a cyclic voltammogram was run between 0 V and −0.7 V; between 0 V and −0.8 V; between 0 V and −0.9 V; between 0 V and −1.0 V; between 0 V and −1.2 V; between 0 V and −1.3 V; and between 0 V and −1.4 V. These data are shown in FIG. 10.

The data indicate that in each device the electrolyte is stable to the limits of −1.4 V and +1.1 V, and to +1.2 V for each of (d) 3 M Mg(ClO$_4$)$_2$ and PVA, and (e) 5 M NaClO$_4$ and PVP.

Further variations and modifications may be made within the scope of the invention herein disclosed.

The invention claimed is:

1. A single symmetric supercapacitor device comprising: two electrodes, wherein each electrode comprises a 3D foam material obtained by laser irradiating a carbon source; and
a hydrogel electrolyte enveloping the electrodes in an active area, wherein said hydrogel electrolyte comprises a mixture of a hydrogel and a salt;
and wherein the device has an operational voltage window that includes 2.6V.

2. The symmetric supercapacitor device according to claim 1, wherein the salt includes NaClO$_4$.

3. The symmetric supercapacitor device according to claim 1, comprising ionic charge carriers.

4. The symmetric supercapacitor device of claim 3, wherein the ionic charge carriers are hydrated.

5. The symmetric supercapacitor device according to claim 1, wherein said electrodes comprise porous graphene.

6. The symmetric supercapacitor device according to claim 1, wherein said electrodes comprise 3D graphene.

7. The symmetric supercapacitor device according to claim 6, wherein the 3D graphene is formed on a substrate.

8. The symmetric supercapacitor device according to claim 7, wherein the substrate is a polyimide substrate.

9. The symmetric supercapacitor device according to claim 7, wherein the substrate forms a substrate of the device.

10. The symmetric supercapacitor device according to claim 1, wherein the symmetric supercapacitor device is flexible.

11. The device of claim 1 where the operational voltage lies between +1.2V and −1.4V.

12. The symmetric supercapacitor device according to claim 1, wherein the salt includes Mg(ClO$_4$)$_2$.

13. The symmetric supercapacitor device according to claim 1, wherein the salt includes sodium sulphate, sodium disulphate, sodium persulphate, sodium perchlorate, lithium perchlorate, magnesium perchlorate, sodium nitrate, or lithium hexafluoride arsenate.

14. The symmetric supercapacitor device according to claim 1, wherein the salt includes a phosphonium salt, a perchlorate salt, a nitrate salt or an arsenate salt.

15. A method of manufacturing a single symmetric supercapacitor device, the method including the steps of:
(i) two electrodes comprising a 3D foam material are formed on a substrate by laser irradiating a carbon source;
(ii) an electrolyte precursor comprising charge carriers including a salt and a hydrogel is applied to the electrodes;
(iii) an electrolyte is formed from the electrolute precursor, causing the electrodes to be embedded in the electrolyte in an active area to provide the device with an operational voltage window that includes 2.6V.

16. The method of manufacturing a symmetric supercapacitor device according to claim 15, wherein the electrolyte precursor is prepared by preparing an aqueous solution of charge carriers including the salt and by mixing this aqueous solution with the hydrogel.

17. The method of manufacturing a symmetric supercapacitor device according to either claim 15, wherein the electrodes are formed in situ.

18. The method of manufacturing a symmetric supercapacitor device according to claim 15, wherein the electrodes are formed by irradiating said substrate with laser radiation.

19. The method of manufacturing a symmetric supercapacitor device according to claim 15, where the operational voltage lies between +1.2V and −1.4V.

20. The symmetric supercapacitor device according to claim 1, wherein the salt includes NaNO$_3$.

21. The method of manufacturing a symmetric supercapacitor device according to claim 15, wherein the salt includes NaClO$_4$.

22. The method of manufacturing a symmetric supercapacitor device according to claim 15, wherein the salt includes Mg(ClO$_4$)$_2$.

23. The method of manufacturing a symmetric supercapacitor device according to claim 15, wherein the salt includes NaNO$_3$.

24. The method of manufacturing a symmetric supercapacitor device according to claim 15, wherein the salt includes sodium sulphate, sodium disulphate, sodium persulphate, sodium perchlorate, lithium perchlorate, magnesium perchlorate, sodium nitrate, or lithium hexafluoride arsenate.

25. The method of manufacturing a symmetric supercapacitor device according to claim 15, wherein the salt includes a phosphonium salt, a perchlorate salt, a nitrate salt or an arsenate salt.

* * * * *